United States Patent [19]

Fisher et al.

[11] Patent Number: 5,778,391
[45] Date of Patent: Jul. 7, 1998

[54] METHOD AND SYSTEM FOR RECLAIMING STACKED VOLUMES WITHIN A PERIPHERAL DATA STORAGE SUBSYSTEM

[75] Inventors: James Arthur Fisher; Frank David Gallo, both of Tucson; Gregory Tad Kishi, Oro Valley, all of Ariz.

[73] Assignee: International Business Machines Corporation, Armonk, N.Y.

[21] Appl. No.: 716,005

[22] Filed: Sep. 19, 1996

[51] Int. Cl.⁶ ............................................. G06F 17/30
[52] U.S. Cl. .................... 707/204; 395/182.04; 711/117
[58] Field of Search ........................... 707/200, 204; 711/117, 115; 395/674, 182.04; 323/241

[56] References Cited

U.S. PATENT DOCUMENTS

| | | | |
|---|---|---|---|
| 4,876,662 | 10/1989 | Pence | 364/900 |
| 5,140,683 | 8/1992 | Gallo et al. | 711/117 |
| 5,276,867 | 1/1994 | Kenley et al. | 395/600 |
| 5,325,523 | 6/1994 | Beglin et al. | 707/200 |
| 5,378,978 | 1/1995 | Gallo et al. | 323/241 |
| 5,438,674 | 8/1995 | Keele et al. | 395/404 |
| 5,440,686 | 8/1995 | Dahman et al. | 395/164 |
| 5,455,926 | 10/1995 | Keele et al. | 395/404 |
| 5,457,793 | 10/1995 | Elko et al. | 395/600 |
| 5,463,668 | 10/1995 | Elko et al. | 711/130 |
| 5,546,557 | 8/1996 | Allen et al. | 395/438 |
| 5,634,072 | 5/1997 | Allen et al. | 395/674 |
| 5,644,766 | 7/1997 | Coy et al. | 707/204 |
| 5,664,146 | 9/1997 | Bolin et al. | 711/115 |
| 5,673,382 | 9/1997 | Cannon et al. | 395/182.04 |

OTHER PUBLICATIONS

IBM Technical Disclosure Bulletin, vol. 35, No. 5, Oct. 1992; "Logical Grouping of Data Storage Media In A Library System".

IBM Technical Disclosure Bulletin, vol. 37, No. 09, Sep. 1994; "Full Volume Migration".

*Primary Examiner*—Thomas G. Black
*Assistant Examiner*—Charles L. Rones
*Attorney, Agent, or Firm*—Robert M. Sullivan; Antony P. Ng; Andrew J. Dillon

[57] ABSTRACT

A method and system for reclaiming stacked volumes within a peripheral data storage subsystem is disclosed. In accordance with the method and system of the present invention, a database is interrogated to determine whether or not an opportunistic reclaim threshold of a stacked volume has been reached after a service request from a host computer has been performed on a stacked volume and while the stacked volume is still mounted. If the opportunistic reclaim threshold of the stacked volume has not been reached, the stacked volume is released and dismounted. However, if the reclaim threshold of the stacked volume has been reached, another determination is made as to whether or not a service request for the host computer is pending. If the host computer requires service, the stacked volume is again released and dismounted. Otherwise, if the host computer does not require service, at least one data set from the mounted stacked volume is opportunistically reclaimed while the stacked volume is still mounted.

14 Claims, 5 Drawing Sheets

METHOD AND SYSTEM FOR RECLAIMING STACKED VOLUMES WITHIN A PERIPHERAL DATA STORAGE SUBSYSTEM

BACKGROUND OF THE INVENTION

1. Technical Field

The present invention relates to a method and system for data storage in magnetic tapes in general and, in particular, to a method and system for organizing storage data in magnetic tapes. Still more particularly, the present invention relates to a method and system for reclaiming stacked volumes within a peripheral data storage subsystem.

2. Description of the Prior Art

The average size of most computer-generated data sets is significantly smaller than the storage capacity of a magnetic tape. While typical programming support for tape storage subsystems does not provide a general solution for storing multiple data sets in a single magnetic tape, the potential storage capacity of the magnetic tapes within a tape storage subsystem is often not fully realized. In most cases, only a very small portion of every magnetic tape is occupied by a single small data set while the majority portion of these magnetic tapes are left unutilized.

In order to better utilize the data-storage capacity of a magnetic tape, data sets which would have been stored in multiple magnetic tapes can be collected into a single physical tape known as a stacked volume. The method and system for storing and managing several logical volumes in one stacked volume are described in detail in U.S. Pat. No. 5,546,557, entitled "SYSTEM FOR STORING AND MANAGING PLURAL LOGICAL VOLUMES IN EACH OF SEVERAL PHYSICAL VOLUMES INCLUDING AUTOMATICALLY CREATING LOGICAL VOLUMES IN PERIPHERAL DATA STORAGE SUBSYSTEM," and is incorporated by reference herein. Under the abovementioned patent, a peripheral data storage subsystem is utilized in conjunction with an automated tape library, thus a host processor and/or the personnel operating the host processor usually have no direct activities that are related to the storage of several volumes of data in a single physical tape. As such, the storage capacity utilization of each magnetic tape is greatly enhanced and the need for personal attention to the peripheral data storage system is obviated.

The automated tape library, as disclosed in the above-mentioned patent, is a closed store system. Hence, at some point in time, the automated tape library will eventually reach a steady state in which available space required to store additional data sets will have to come from reclaimable space of previously stacked volumes. Typically, a space within a stacked volume will become reclaimable when the data set occupying such space is no longer current because a more recent copy of the data set is created on another stacked volume or the data set has been deleted. Needless to say, in a real-time on-line data processing system, the operations associated with the reclaim process must be accomplished as efficiently as possible in order to maintain acceptable performance. This invention provides an efficient method and system for reclaiming stacked volumes within a peripheral data storage subsystem such that the performance of the data processing will not be affected during the reclaiming process.

SUMMARY OF THE INVENTION

In view of the foregoing, it is therefore an object of the present invention to provide an improved method and system for data storage in magnetic tapes.

It is another object of the present invention to provide an improved method and system for organizing storage data in magnetic tapes.

It is yet another object of the present invention to provide an improved method and system for reclaiming stacked volumes within a peripheral data storage subsystem.

In accordance with the method and system of the present invention, a database is interrogated to determine whether or not an opportunistic reclaim threshold of a stacked volume has been reached after a service request from a host computer has been performed on a stacked volume and while the stacked volume is still mounted. If the opportunistic reclaim threshold of the stacked volume has not been reached, the stacked volume is released and dismounted. However, if the reclaim threshold of the stacked volume has been reached, another determination is made as to whether or not a service request for the host computer is pending. If the host computer requires service, the stacked volume is again released and dismounted. Otherwise, if the host computer does not require service, at least one data set from the mounted stacked volume is opportunistically reclaimed while the stacked volume is still mounted.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of peripheral data storage subsystems. For the purpose of illustration, a preferred embodiment of the present invention, as described below, is implemented in a Peripheral Data Storage Subsystem 3494 with 3590 tape drives and cartridges, all manufactured by International Business Machines Corporation.

Figure 1:
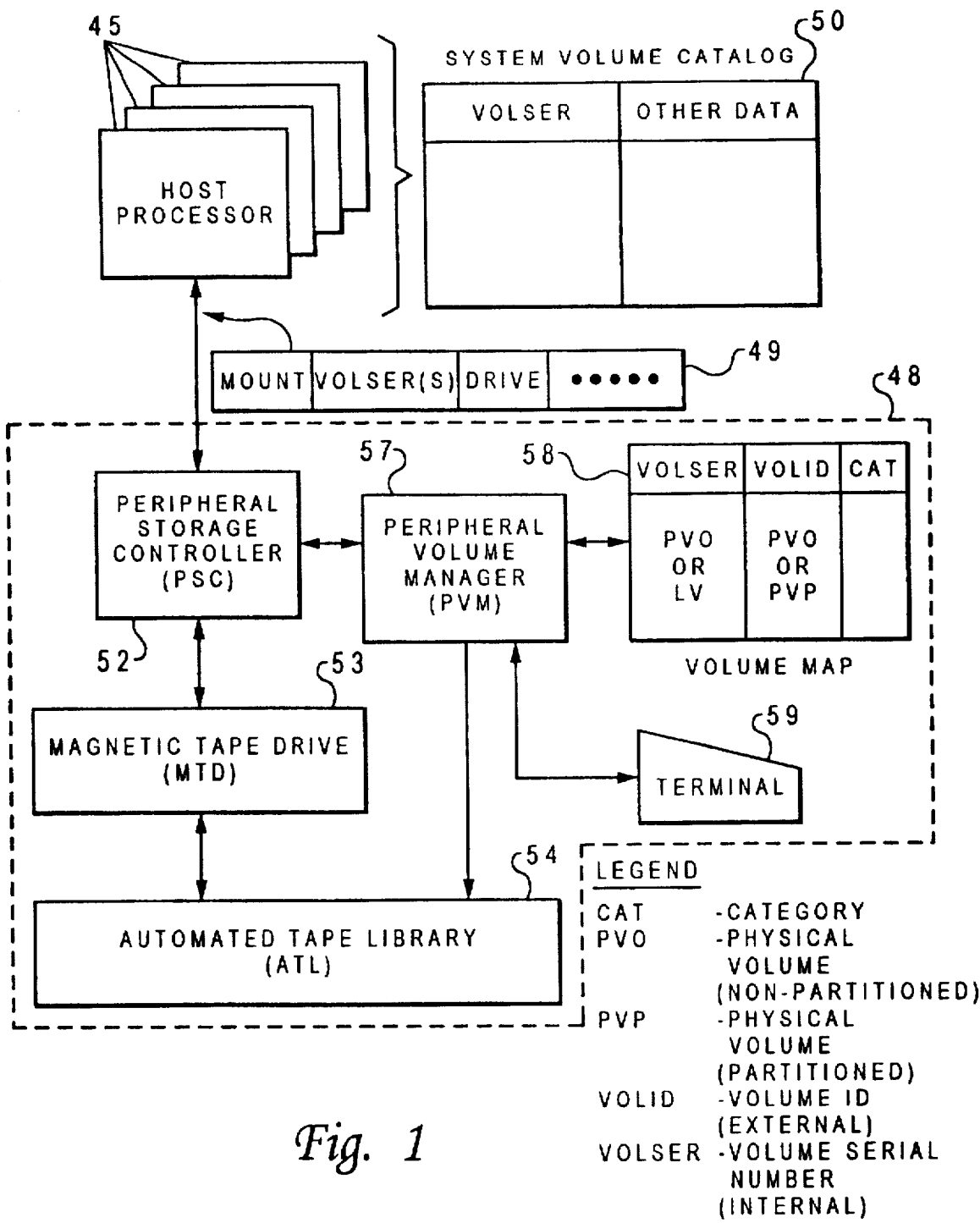
FIG. 1 is an illustration of a peripheral data storage subsystem in which the present invention may be included.

Referring now to the drawings and in particular to FIG. 1, there is illustrated a peripheral data storage subsystem 48 in which the present invention may be included. As shown, peripheral data storage subsystem 48 is connected to host processors 45. A MOUNT command 49 can be sent by any one of host processors 45 to peripheral data storage subsystem 48 in order to request the mounting of a data storage volume. MOUNT command 49 includes a MOUNT command indicator, internal volume serial number(s) (VOLSER) indicating data storage volume(s) to be mounted, address(es) of tape drive(s) to mount the respective data storage volume(s), etc. Peripheral data storage subsystem 48 responds to MOUNT command 49 by creating/establishing a logical volume for each VOLSER identification that does not correspond to any data storage logical volume established within peripheral data storage subsystem 48.

Host processors 45 maintain a system volume catalog 50 indexed by VOLSER and having other data relating to VOLSER, such as a table of contents, expiration date, etc., as is known in prior art. Each logical volume appears as a true addressable data-storing volume to host processors 45 that is mountable within peripheral data storage subsystem 48.

Peripheral storage controller (PSC) 52 attaches peripheral data storage subsystem 48 to host processors 45. PSC 52 includes data flow circuits, error detection and correction circuits, device attaching circuits, inter-PSC communication circuits, etc. A number of magnetic tape drives (MTDs) 53 are attached to PSC 52. Automated tape library (ATL) 54 receives, stores, and supplies physical tapes from, for, and to MTDs 53.

A peripheral volume manager (PVM) 57 within peripheral data storage subsystem 48 provides automatic data storage volume management including automatic creation/establishment of data storage volumes addressable by host processors 45 based upon information contained in system volume catalog 50. Volume map 58 is maintained and stored in a direct access storage device (DASD) by PVM 57. Volume map 58 includes several entries, each entry including a VOLSER field for identifying a data storage volume, a VOLID field for containing a respective logical volume, and a CAT field for specifying a category of the logical volume. A subsystem data base is maintained for enabling PVM 57 to perform volume creation and management in data storage subsystem 48. Volume map 58 may be a separate "cached" portion of the data base or be three fields in each data base entry.

Terminal 59 is for initializing PVM 57, though host processors 45 can initialize peripheral data storage subsystem 48 for automatic volume creation as well. PVM 57 may be either a separate electronic control or an executable computer program in PSC 52. As indicated by the arrow extending from PVM 57 to ATL 54, PVM 57 may include programming that manages ATL 54 as a library manager.

Figure 2:
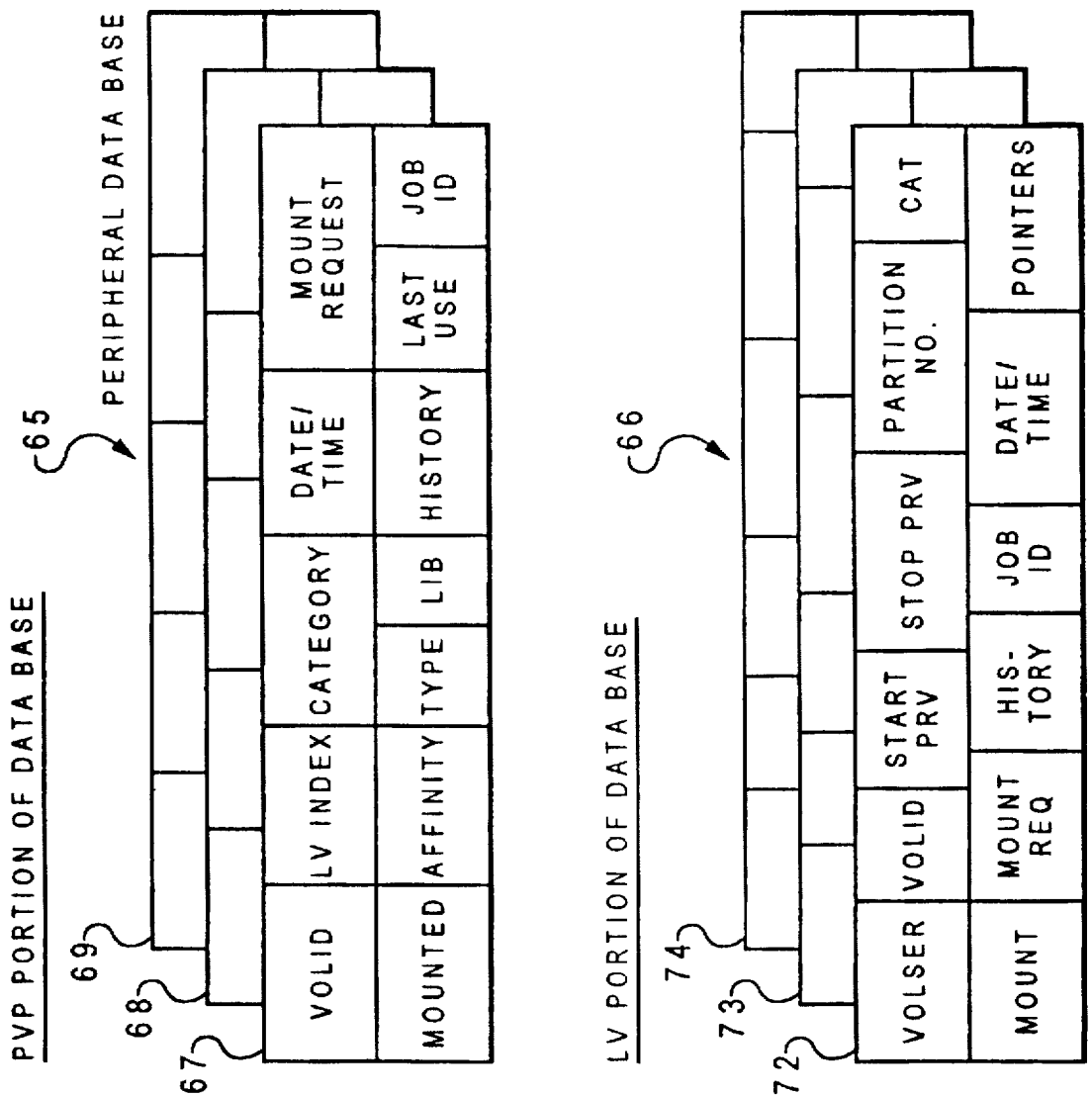
FIG. 2 is a depiction of a data base structure that a peripheral volume manager utilizes to manage the volumes within the peripheral data storage subsystem of FIG. 1.

With reference now to FIG. 2, there is illustrated a data base structure that PVM 57 utilizes to manage the volumes within peripheral data storage subsystem 48. Volume map 58 of FIG. 1 also represents a portion of the subsystem data base. As shown in FIG. 2, a data base organization suitable for non-partitioned physical volumes (PVOs), partitioned physical volumes (PVPs), and logical volumes (LVs) is logically divided into two portions, namely, a PVP portion 65 for physical volumes and an LV portion 66 for logical volumes. Entries 67, 68, and 69 are illustrative of PVP and PVO entries while entries 72, 73, and 74 are illustrative of LV entries. If PVPs and PVOs having diverse data storage capacities reside in the subsystem, then the PVP entries may also contain data storage capacity information (not shown).

In each entry of PVP portion 65, a VOLID field identifies the physical volume. If the LV index field is null, then the PVP is empty. If the LV index field contains a special character or the VOLID, then the physical volume is a PVO. The data base can be restricted to describing LVs and PVPs; in the latter instance, no PVOs are described in the data base. For a physical volume entry describing a PVP, the LV index has a data base pointer to a linked list of VOLSER or LV entries in the LV portion 66 for all LVs residing in the described PVP. The available data storage space of an LV-occupied PVP can be calculated by reading the linked list of LV portion 66 for accessing the starting and ending position reference values for each LV.

Further, a category field indicates any category the physical volume is assigned to. A date/time field indicates the date and time of entry of the PVP into the managed subsystem. A mount request field indicates whether or not there is an outstanding request to mount the physical volume. For a PVO, the mount request is for the physical volume, while for a PVP, the mount request is for an LV residing in the PVP. The mount request for each LV to be mounted is also indicated in LV portion 66. A mounted field indicates whether or not the PVP or PVO is mounted on a tape drive and the subsystem address of such tape drive. A null mounted field can be utilized to indicate that the PVP or PVO is not mounted. If the PVP or PVO has an assigned affinity characteristic, an affinity field indicates that characteristic. A type field indicates whether the PVP is a fixed-size partitioned or a variable-size partitioned physical volume. A library field indicates the address at which the physical volume is stored in an automatic library. A history field may be utilized to indicate a recent history of the physical volume, such as mount history, LV additions/deletions, error conditions, and the like. A last-use field indicates the last time the physical volume was mounted on any tape drive. Such last usage can be utilized in connection with volume replacement or ejection algorithms that are beyond the scope of this description. Job ID field may indicate the host processor Job ID associated with the last usage. In many instances, the Job ID is not made available to the subsystem such that the field may be dispensed with or may be nulled. Other fields may be added to the PVP/PVO entries, as desired.

LV portion 66 has a large number of LV entries represented by entries 72–74. A VOLSER field identifies the logical volume. A VOLID field identifies the PVP in which the LV resides. If VOLID is null or empty, then either the LV has not been created (the VOLSER is available for assignment to an LV to be created) or that an LV has been "scratched." The term scratched merely means that the VOLSER does not identify any LV, i.e., the VOLSER is disassociated from any PVP. The start-PRV and stop-PRV fields identify the limits of the VOLSER-identified LV (more correctly, they identify the limits of the partition in which the LV resides). The number of segments in a partition holding the LV is an indication of the LV data storage capacity. Note that segments have different data storage capacities such that the segment numbers are used in calculating capacity for an LV. The number of the partition having the LV is indicated in the partition no. field. For example, host processor accessible partitions are numbered in each PVP from 0 to N, where N is a positive integer indicating the highest-numbered existing partition. The CAT field contains the category code(s) appertaining to the identified LV. Such categories may be the same as the categories for the host PVP; no limitation thereto is intended. The LV categories can be independent of the PVP categories. MOUNT and MOUNT REQ fields respectively indicate the status of the LV as mounted or requested to be mounted.

Because each PVP may hold a plurality of LVs, only one of the LVs may have a mounted status. A history field indicates the recent mount history and other usage of the LV. The history field may include the information in the Job ID and Date/Time fields. A pointers field contains the data base pointers creating the linked list. Such linking may be either singly or doubly linked.

Figure 3:
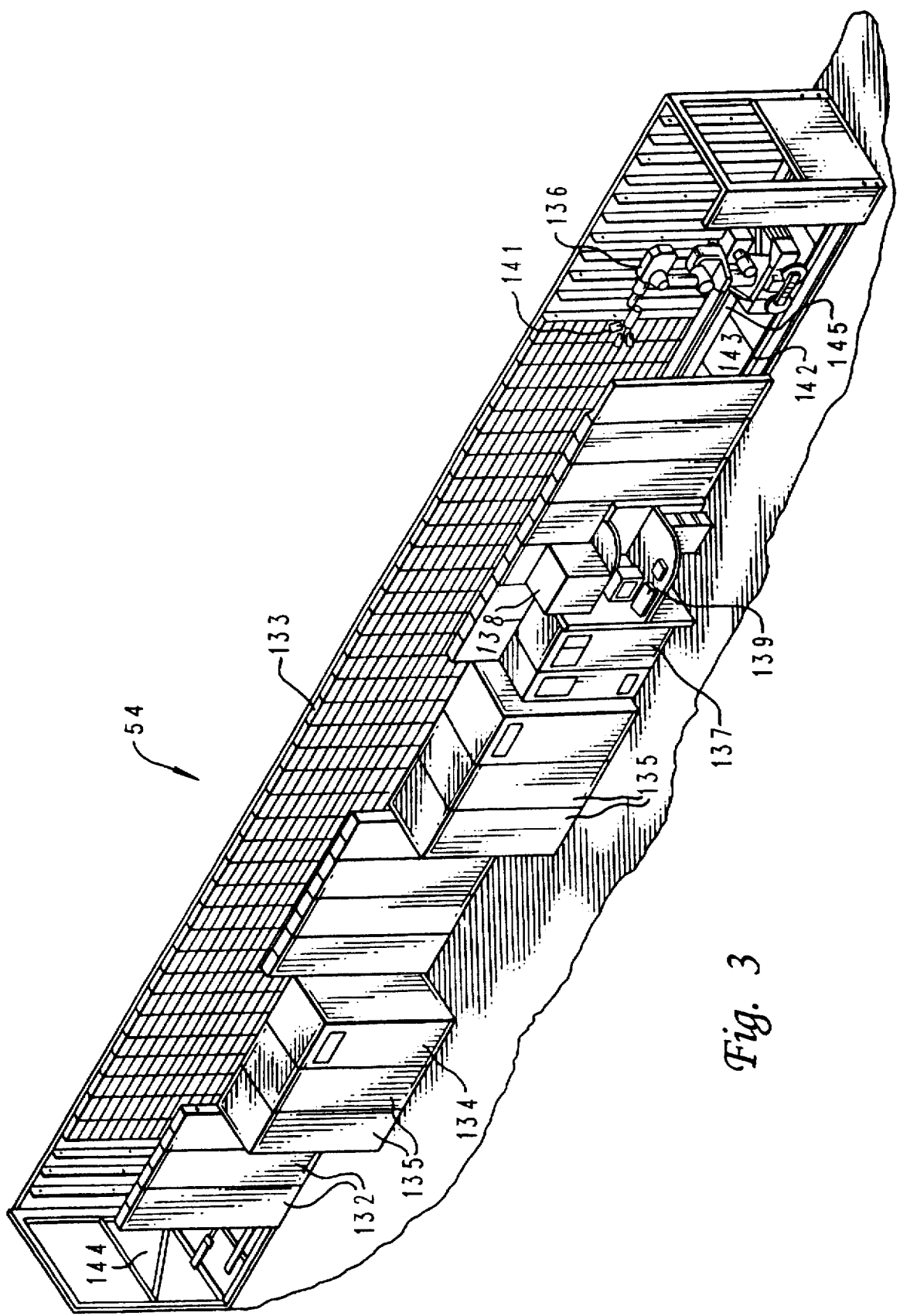
FIG. 3 is a diagram of an automated tape library for managing a large number of magnetic tapes in which data are stored.

Referring now to FIG. 3, there is depicted an automated tape library 54 of FIG. 1 for managing a large number of magnetic tapes in which data are stored. Each magnetic tape is housed within a plastic cartridge for providing protection to the magnetic tape as well as providing a convenient handling mechanism for a robotic picker. Each cartridge is termed as a volume. Automatic tape library 54 includes a number of modules 132, and each module is made up of several magazine holders 133. Each magazine holder 133 consists of a number of storage slots, and each storage slot is capable of storing a volume. Automatic tape library 54 also includes a number of tape units, such as an IBM™ 3590 Magnetic Tape Subsystem having a controller 134 and tape drives 135. A robot 136, having a gripper/vision assembly 141, travels on an outrigger rail 142 and a guide rail 145 to transfer tape cartridges between magazine holders 133 and tape drives 135. Robot 136 should be anthropomorphic in that it is capable of human-like motions. Robot 136 is depicted with one gripper/vision assembly 141, but may be provided with two or more such assemblies allowing robot 136 to perform two or more operations at a single location, such as a demount and a mount of volumes from one of tape drives 135.

A robot controller 137, attaching to automatic cartridge library system 54, commands robot 136. A service bay 143 for robot 136, is located at one end of automated cartridge library system 54. Service bay 143 functions as a parking space for robot 136 when robot 136 is not in-use or when robot 136 is being serviced. An operator access bay 144 is provided at the other end of automatic tape library 54, allowing service personnel to enter. In addition, a remote terminal bay 138, accessible internally by service personnel, is also attached to automated tape library 54. A library manager 139, connecting to automated tape library 54, allows an operator to determine system status, promote a tape cartridge mount status, and generally enter external instructions into automated tape library 54. Library manager 139 is provided by an appropriately programmed personal computer such as an IBM™ Aptiva™.

Figure 4:
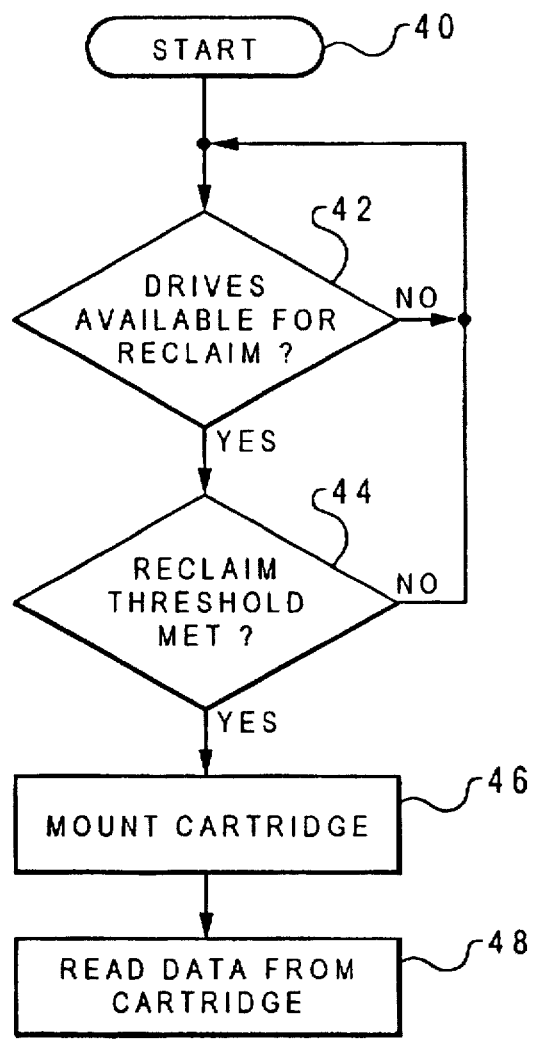
FIG. 4 is a high-level flow diagram of a method for reclaiming stacked volumes within a peripheral data storage subsystem according to prior art.

Under prior art, tape reclaiming is performed under a so-called "reclaim cycle." With reference now to FIG. 4, there is depicted a high-level flow diagram of a method for reclaiming stacked volumes according to prior art. Starting at block 40, a reclaim cycle begins by determining whether or not there is any tape drive available for tape reclaiming, as shown in block 42. The process loops back to block 42 until there are two drives available. Then, another determination is made as to whether or not a reclaim threshold is met, as shown in block 44. If the reclaim threshold of a cartridge is not met, the process keeps looping back to block 44. Otherwise, if the reclaim threshold of a cartridge is met, two cartridges will be mounted onto two separate tape drives, as depicted in block 46. One tape drive is for reading data, while the other tape drive is writing data. Finally, data is read from one tape and written onto the other tape, as shown in block 48. Not only are two tape drives required concurrently, but the reclaim cycle under prior art demands two tape-mounting steps and two tape-dismounting steps, which are very time-consuming.

Figure 5:
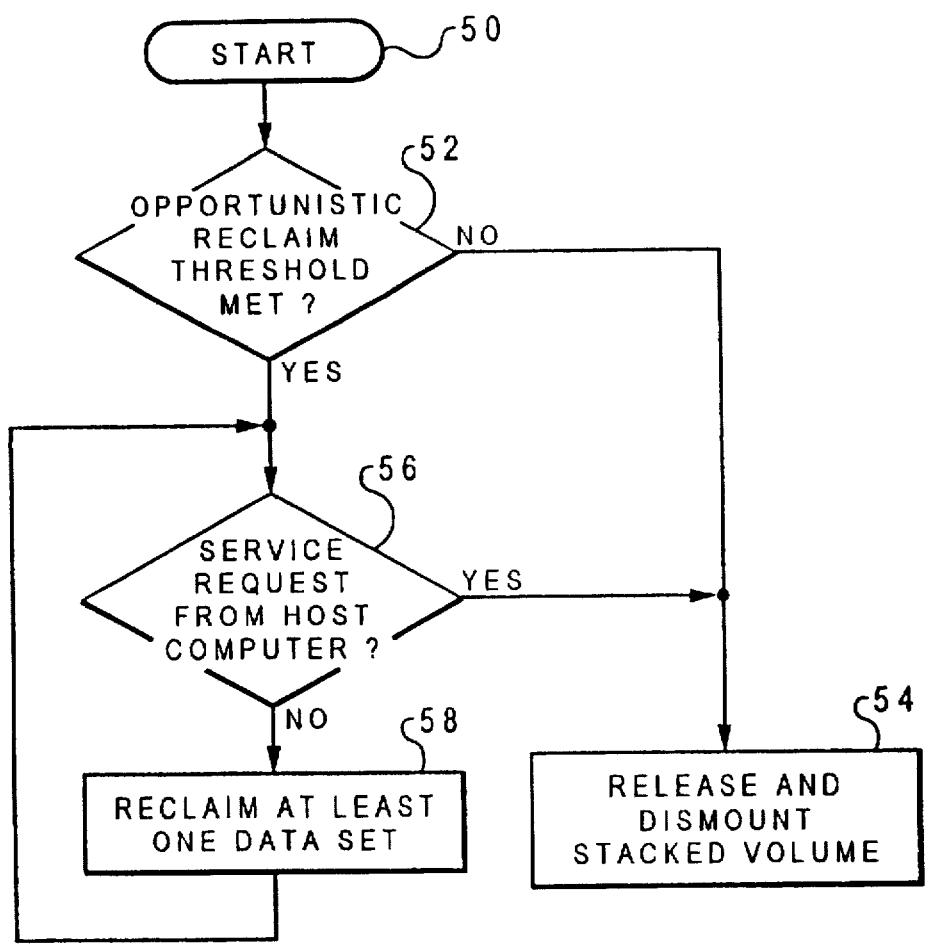
FIG. 5 is a high-level flow diagram of a method for reclaiming stacked volumes within a peripheral data storage subsystem in accordance with a preferred embodiment of the invention.

Referring now to FIG. 5, there is depicted a high-level flow diagram of a method for reclaiming stacked volumes within a peripheral data storage subsystem in accordance with a preferred embodiment of the invention. Starting at block 50, after a read operation requested by the host computer has been performed on a stacked volume, a determination is made as to whether or not an opportunistic reclaim threshold of the stacked volume has been reached, as shown in block 52. As a preferred embodiment of the invention, the opportunistic reclaim threshold is higher than the reclaim threshold under prior art such that the opportunistic reclaim threshold will be triggered before the reclaim threshold under prior art. If the opportunistic reclaim threshold of the stacked volume has not been reached, the stacked volume is released and dismounted, as depicted in block 54. Otherwise, if the opportunistic reclaim threshold of the stacked volume has been reached, another determination is made as to whether or not the host computer requires immediate service, as illustrated in block 56. If the host computer requires immediate service, the stacked volume is released and dismounted, as depicted in block 54. However, if immediate service is not required by the host computer, at least one data set from the stacked volume is reclaimed opportunistically while the stacked volume is still mounted, as shown in block 58, before the process is returned back to block 56. By this, the data sets in a stacked volume can be reclaimed without additional tape mounting and dismounting. In the meantime, the stacked volume reclaiming method under prior art is also executing in conjunction with the stacked volume reclaiming method in accordance with a preferred embodiment of the present invention.

Figure 6:
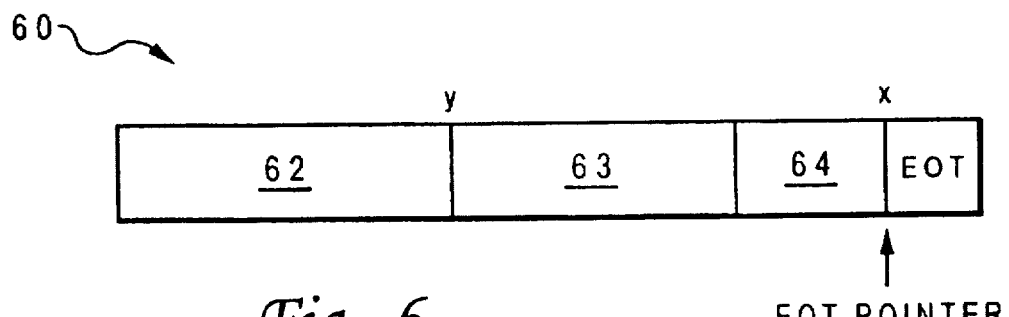
FIG. 6 is a pictorial representation of a stacked volume in the database of the peripheral volume manager.

Optionally, the concept of stacked volume reclaiming can be taken one step further, a partial stacked volume reclaiming can be performed without any mounting of a physical tape. With reference now to FIG. 6, there is a pictorial representation of a stacked volume in the database of the peripheral volume manager. In a situation as depicted in FIG. 6 when there are several non-current data sets 63 located between a series of data sets 62 at the beginning of a stacked volume 60 and one data set 64 at the end of stacked volume 60, an end-of-tape (EOT) pointer in the data base can be moved from point x to point y as soon as data set 64 expires. In this case, stacked volume 60 is partially reclaimed without any physical tape mounting. If the method of opportunistic reclaiming is utilized in conjunction with the optional non-mounting tape reclaiming, the method of opportunistic reclaiming can be further enhanced by reading the last reclaimable data set on the stacked volume first. This allows the data storage peripheral subsystem to still reclaim as much space at the end of the tape as possible if the opportunistic reclaiming step is interrupted by a service request from the host processor.

As has been described, the present invention provides an improved method for reclaiming stacked volumes within a peripheral data storage subsystem. The present invention seeks to improve efficiency of the reclaim process by checking any stacked volume already mounted to satisfy a specific read request and performing a reclaim operation opportunistically while the stacked volume is still mounted. Further, the present invention automatically reclaims any space on a stacked volume that is the last valid data set on the stacked volume and changes from a valid data set to an expired, or otherwise no longer needed, data set. Both the space occupied by this last data set on a stacked volume and any immediately proceeding unusable space becomes logically reclaimed without any physical mounting of the stacked volume required. Finally, the method of opportunistic reclaiming may be utilized in conjunction with the optional non-mounting tape reclaiming by reading the last reclaimable data set on the tape first. This allows reclaiming to be performed at the end of the tape as much as possible if the opportunistic reclaiming step is interrupted by a service request from the host processor.

While the invention has been particularly shown and described with reference to a preferred embodiment, it will be understood by those skilled in the art that various changes in form and detail may be made therein without departing from the spirit and scope of the invention.

What is claimed is:

1. A method for reclaiming stacked volumes within a peripheral data storage subsystem, wherein said peripheral data storage subsystem includes a manager for controlling operations, a controller connected to said manager for attaching said subsystem to a host processor, a plurality of addressable media devices for removably receiving physical volumes of data storage media, a plurality of tape drives connected to said manager and to said media devices for mounting and dismounting said physical volumes of data storage media, said method comprising the steps of:

interrogating a database in said manager to determine if an opportunistic reclaim threshold of a stacked volume has been reached after an operation requested by said host computer has been performed on said stacked volume while said stacked volume is still mounted, wherein said opportunistic reclaim threshold specifies a minimum allowable amount of valid data on said stacked volume;

in response to a determination that said opportunistic reclaim threshold of said stacked volume has been reached, determining if a service request for said host computer is pending; and in response to a determination that said host computer does not require service, opportunistically reclaiming at least one data set from said mounted stacked volume while said stacked volume is still mounted.

2. The method for reclaiming stacked volumes within a peripheral data storage subsystem according to claim 1, wherein said opportunistic reclaim threshold is greater than zero.

3. The method for reclaiming stacked volumes within a peripheral data storage subsystem according to claim 1, wherein said method further includes a step of dismounting said stacked volume, in response to a determination that said reclaim threshold of said stacked volume has not been reached.

4. The method for reclaiming stacked volumes within a peripheral data storage subsystem according to claim 1, wherein said method further includes a step of dismounting said stacked volume, in response to a determination that said host computer requires service.

5. The method for reclaiming stacked volumes within a peripheral data storage subsystem according to claim 1, wherein said step of opportunisticlly reclaiming at least one data set further includes a step of reclaiming the last reclaimable data set first.

6. The method for reclaiming stacked volumes within a peripheral data storage subsystem according to claim 1, wherein said method further includes a step of concatenating unutilized spaces at the end of a data storage media by moving a pointer within said database without mounting said stacked volume.

7. The method for reclaiming stacked volumes within a peripheral data storage subsystem according to claim 1, wherein said opportunistically reclaiming step further includes a step of opportunistically reclaiming at least one data set from said mounted stacked volume while said stacked volume is still mounted, only in response to a determination that said host computer does not require service.

8. A peripheral data storage subsystem comprising:

a manager for controlling operations;

a controller connected to said manager for attaching said subsystem to a host processor;

a plurality of addressable media devices for removably receiving physical volumes of data storage media;

a plurality of tape drives connected to said manager and to said media devices for mounting and dismounting said physical volumes of data storage media;

means for interrogating a database in said manager to determine whether or not an opportunistic reclaim threshold of a stacked volume has been reached after an operation requested by said host computer has been performed on said stacked volume while said stacked volume is still mounted, wherein said opportunistic reclaim threshold specifies a minimum allowable amount of valid data on said stacked volume;

means for determining if a service request for said host computer is pending, in response to a determination that said opportunistic reclaim threshold of said stacked volume has been reached; and means for opportunistically reclaiming at least one data set from said mounted stacked volume while said stacked volume is still mounted, in response to a determination that said host computer does not require service.

9. The peripheral data storage subsystem according to claim 8, wherein said opportunistic reclaim threshold is greater than zero.

10. The peripheral data storage subsystem according to claim 8 further includes means for dismounting said stacked volume in response to a determination that said reclaim threshold of said stacked volume has not been reached.

11. The peripheral data storage subsystem according to claim 8 further includes means for dismounting said stacked volume in response to a determination that said host computer requires service.

12. The peripheral data storage subsystem according to claim 8, wherein said means for opportunisticlly reclaiming at least one data set further includes means for reclaiming the last reclaimable data set first.

13. The peripheral data storage subsystem according to claim 8 further includes means for moving a pointer within said database for concatenating unutilized spaces at the end of a data storage media without mounting said stacked volume.

14. The peripheral data storage subsystem according to claim 6, wherein said opportunistically reclaiming means further includes a means for opportunistically reclaiming at least one data set from said mounted stacked volume while said stacked volume is still mounted, only in response to a determination that said host computer does not require service.

* * * * *